United States Patent [19]
Eggleton et al.

[11] 3,956,945
[45] May 18, 1976

[54] DRIVING TRANSMISSIONS FOR MOTOR VEHICLES

[75] Inventors: Geoffrey Donald Eggleton; Richard Harrison, both of Aldershot, England

[73] Assignee: County Commercial Cars Limited, Aldershot, England

[22] Filed: Feb. 28, 1974

[21] Appl. No.: 447,002

[30] Foreign Application Priority Data
Mar. 7, 1973 United Kingdom............... 11108/73

[52] U.S. Cl................................. 74/710.5; 74/710
[51] Int. Cl.² ........................................... F16H 1/44
[58] Field of Search.................... 74/710, 710.5, 713

[56] References Cited
UNITED STATES PATENTS
2,228,581  1/1941  Olen ................................ 74/710.5
3,195,371  7/1965  Christie.......................... 74/710.5 X FOREIGN PATENTS OR APPLICATIONS
1,010,177  11/1965  United Kingdom................ 74/710.5

Primary Examiner—Samuel Scott
Assistant Examiner—Frank H. McKenzie, Jr.
Attorney, Agent, or Firm—Young & Thompson

[57] ABSTRACT

A driving transmission has two half shafts connected to a pair of land wheels driven by a differential gear mechanism connected to the half shafts, and a differential lock coaxial with one of the half shafts and drivingly connectable with the differential carrier. The differential lock is separated from the differential carrier by a hollow shaft encircling said one half shaft, and the hollow shaft is adapted to be driven by the differential carrier and drivingly connectable with the differential lock. Drive means are also provided in driving relation between the hollow shaft and a second pair of land wheels.

2 Claims, 2 Drawing Figures

DRIVING TRANSMISSIONS FOR MOTOR VEHICLES

BACKGROUND OF THE INVENTION

Field of the Invention

This invention relates to driving transmissions for motor vehicles. More particularly the invention relates to a driving transmission for a first pair of land wheels and including drive means for transmitting the drive to a second pair of land wheels.

SUMMARY

According to the invention a driving transmission having two half shafts connected to a pair of land wheels driven by a differential gear mechanism connected to the half shafts, and a differential lock coaxial with one of the half shafts and drivingly connectable with the differential carrier, is characterised in that the differential lock is separated from the differential carrier by a hollow shaft encircling said one half shaft, which hollow shaft is adapted to be driven by the differential carrier and drivingly connectable with the differential lock, there being provided drive means in driving relation between the hollow shaft and a second pair of land wheels.

Preferably the hollow shaft has at one end drive dogs meshing with drive dogs on the differential carrier, and at the other end further drive dogs meshing with drive dogs on a ring encircling said one half shaft and drivingly connectable with the differential lock.

It is also preferred that the differential lock is spring urged out of connection with the ring, and manually operable means are provided for moving the differential lock axially into driving connection with the ring.

Preferably the drive means provided between the hollow shaft and the second pair of land wheels comprises a crown bevel gear carried on, e.g. integral with, the hollow shaft, the crown bevel gear meshing with a bevel gear on a shaft which transmits the drive to a second differential gear mechanism driving the second pair of land wheels.

The invention also provides a driving transmission as described above, the driving transmission comprising a conversion of a driving transmission for a first pair of land wheels to a driving transmission in which the drive is also transmitted to a second pair of land wheels. In this case the differential lock is conveniently carried by a first sleeve joined to a second sleeve mounted on said one half shaft, by a third sleeve, said third sleeve being encircled by the hollow shaft transmitting the drive to the second pair of land wheels.

The invention further provides a vehicle having a driving transmission as described above, or having a driving transmission converted as described above.

DESCRIPTION OF THE PREFERRED EMBODIMENT

Figure 1:
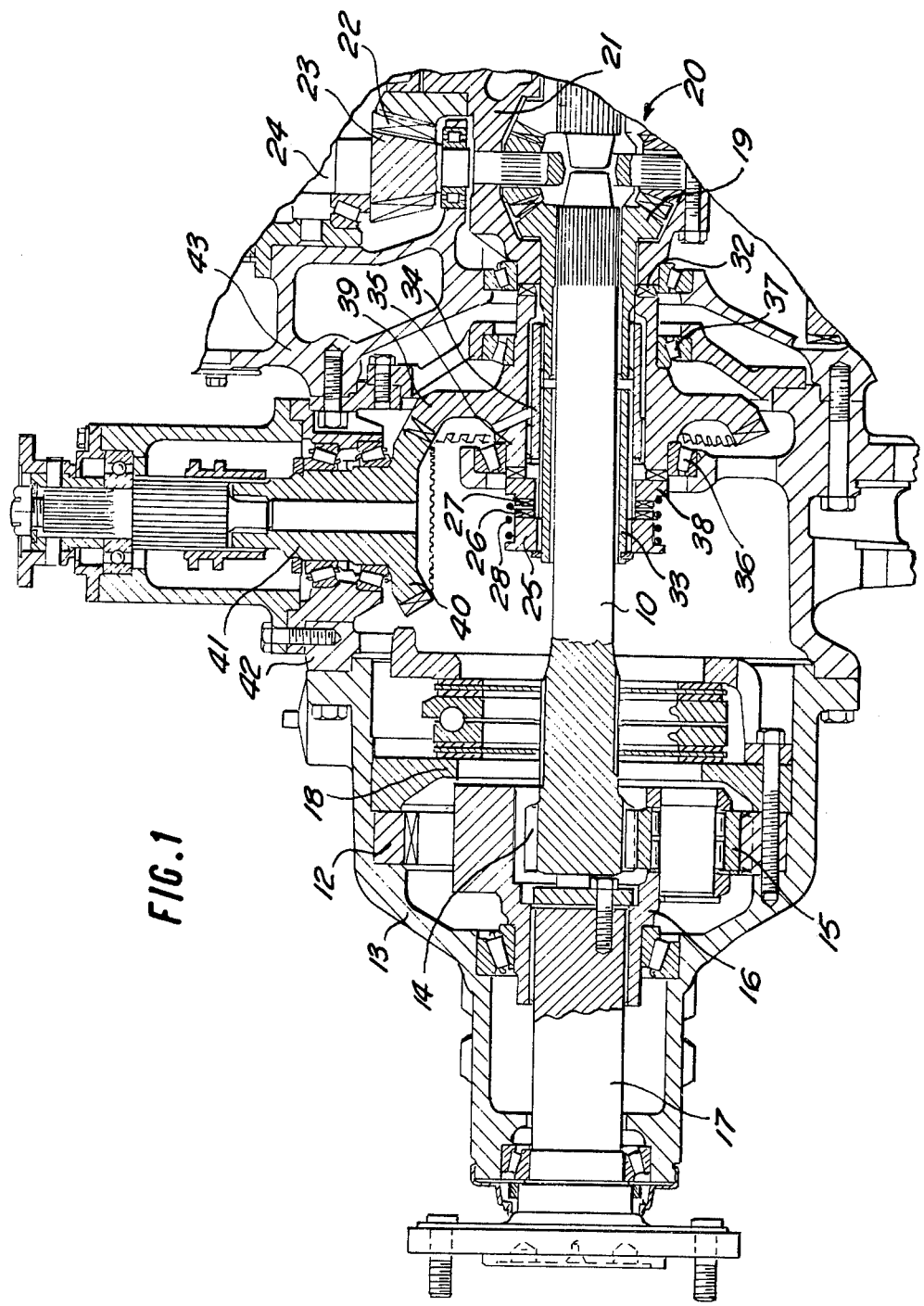
FIG. 1 is a cross-section, by way of example, through a part of the driving transmission.

This example concerns a tractor having a driving transmission for the rear wheels of the tractor. As is customary, each rear wheel is connected to a half shaft 10 (FIG. 1) by means of an epicyclic gear mechanism formed by an annulus 12 fixed to the surrounding casing 13, a sun gear 14 provided on the adjacent end of the half shaft and planet gears 15 which mesh with both the annulus and the sun gear and which are mounted on a carrier 16 splined to an extension shaft 17 to which the rear wheel is attached. Brake discs 18 are also splined to each half shaft in known manner.

The adjacent ends of the half shafts 10 are splined to sleeves 19 and the half shafts are driven by drive means including a first differential gear mechanism 20 housed in a casing 43. This differential mechanism includes a differential carrier 21 for transmitting the drive between a bevel crown gear 22 mounted on the carrier, and the half shafts 10. The bevel crown gear 22 meshes with a bevel gear 23 on a drive shaft 24 extending longitudinally of the tractor and connected to a change gear unit and the tractor engine.

Figure 2:
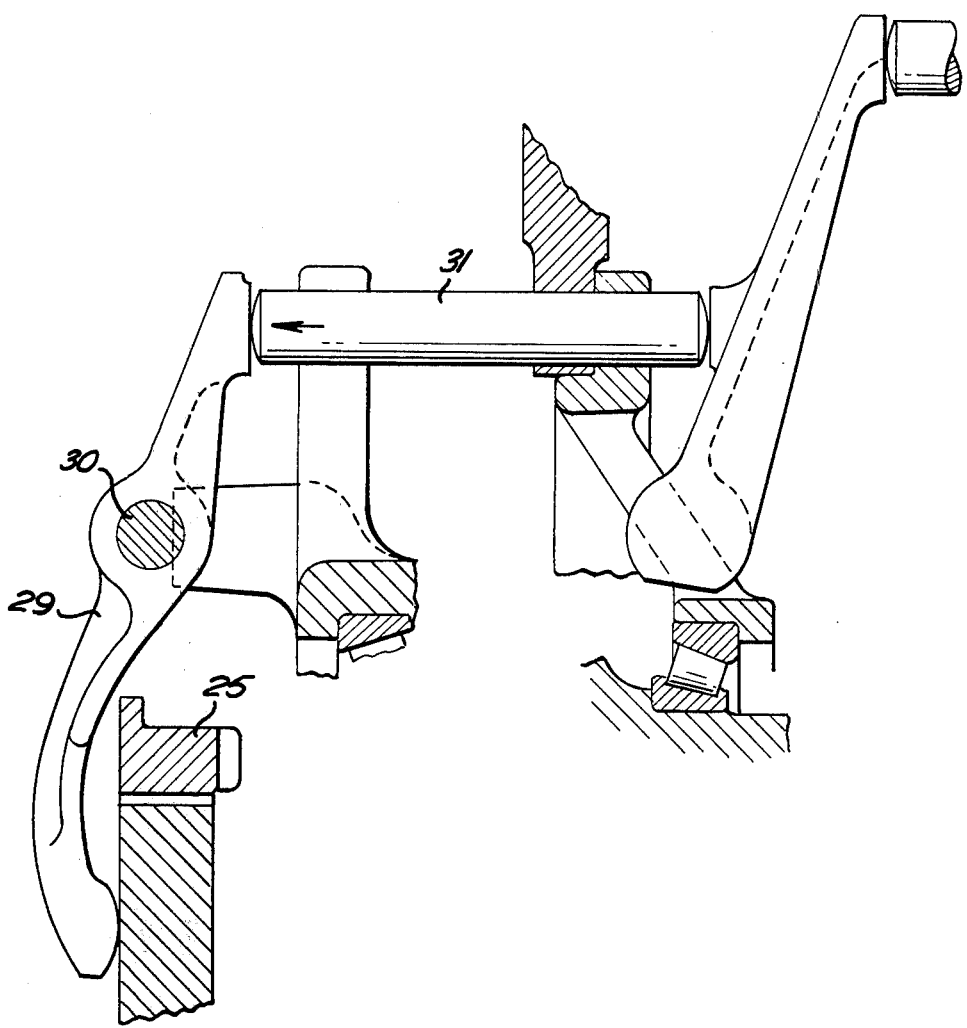
FIG. 2 is a view of the means for engaging the differential lock of the driving transmission.

Also, as in conventional driving transmissions, a differential lock 25 is provided. The differential lock 25 has drive dogs 26 and is urged out of engagement with the adjacent drive dogs 27 by a spring 28. A lever 29 (see FIG. 2) is provided to move the lock 25 to engage the drive dogs 26, 27 when desired. The lever 29 is pivotally mounted by a pin 30 and is operable by a push rod 31.

In a conventional driving transmission the differential lock 25 is splined onto the respective sleeve 19 and the drive dogs 27 are provided on one end of a ring coaxial with the sleeve 19, the other end of the ring having further drive dogs in mesh with drive dogs 32 on the differential carrier 21. However, in accordance with this invention, the differential lock is splined onto a separate sleeve 33 axially spaced along the respective half shaft 10 from the sleeve 19 but connected to the sleeve 19 by a further sleeve 34 of larger diameter and splined to both the sleeves 19 and 33. Also the ring is, in this embodiment, a stepped ring 38 which is spaced from the differential carrier 21 by a hollow shaft 35 mounted in bearings 36, 37 and surrounding the sleeve 34, one end of the shaft having drive dogs in mesh with the adjacent drive dogs of the ring 38 and the other end having drive dogs in mesh with the drive dogs 32 on the differential carrier 21. The necessity for the provision of the stepped ring is to accommodate the sleeve 34 within the hollow shaft 35.

Mounted on the hollow shaft 35 and, in this embodiment, integral therewith, is a second crown bevel gear 39 which meshes with a bevel gear 40 mounted on the end of a stub shaft 41. The stub shaft 41 is connected to a shaft (not shown) extending longitudinally of the tractor for driving a second differential gear mechanism mounted in driving relation with the front wheels of the tractor. The driving transmission of this invention thereby drives both the rear wheels and the front wheels of the tractor and the drive means interconnecting the second crown bevel gear 39 and the front wheels of the tractor may be the same as the arrangement described in our British Pat. Specification No. 1293921.

The driving transmission of this invention may be constructed as described above for driving both the rear and front wheels of a tractor or other vehicle. Alternatively, the invention is applicable to the conversion of a conventional driving transmission designed for driving the rear wheels only of a vehicle. It will be appreciated that, in the latter case, the invention is basically concerned with the separation of the differential lock 25 from the differential carrier 21 to accommodate the hollow shaft 35 for transmitting the drive to the front wheels of the vehicle. Besides the shaft 35, this separation entails the provision of the additional sleeves 33, 34 and a longer half shaft 10. An additional casing 42 for mounting the stub shaft 41 is provided between the casing 43 for the first differential gear mechanism and the casing 13 for the respective epicyclic gear mechanism.

If desired, the second crown bevel gear 39 may be separately constructed from the hollow shaft 35 and, for example, rivetted or bolted thereto.

We claim:

1. A driving transmission having two half shafts connected to a pair of land wheels driven by a differential gear mechanism connected to the half shafts, and a differential lock coaxial with one of the half shafts and drivingly connectable with the differential carrier, wherein the differential lock is separated from the differential carrier by a hollow shaft encircling said one half shaft, which hollow shaft is adapted to be driven by the differential carrier and drivingly connectable with the differential lock, there being provided drive means in driving relation between the hollow shaft and a second pair of land wheels, and wherein the differential lock is carried by a first sleeve joined to a second sleeve mounted on said one half shaft, by a third sleeve, said third sleeve being encircled by the hollow shaft transmitting the drive to the second pair of land wheels.

2. A vehicle having a driving transmission as claimed in claim 1.

* * * * *